A. H. SMITH.
RIM FOR VEHICLE WHEELS.
APPLICATION FILED JULY 1, 1916.
1,367,210.
Patented Feb. 1, 1921.
2 SHEETS—SHEET 1.
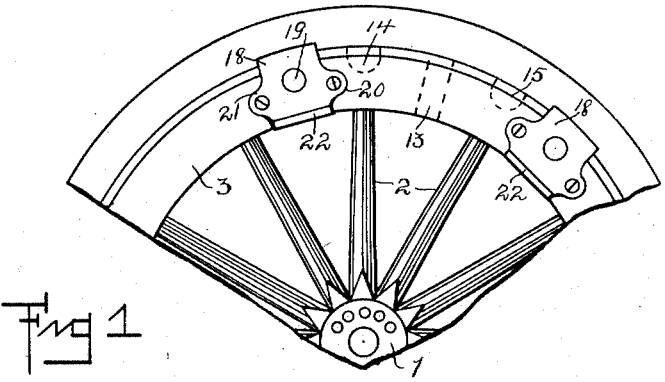
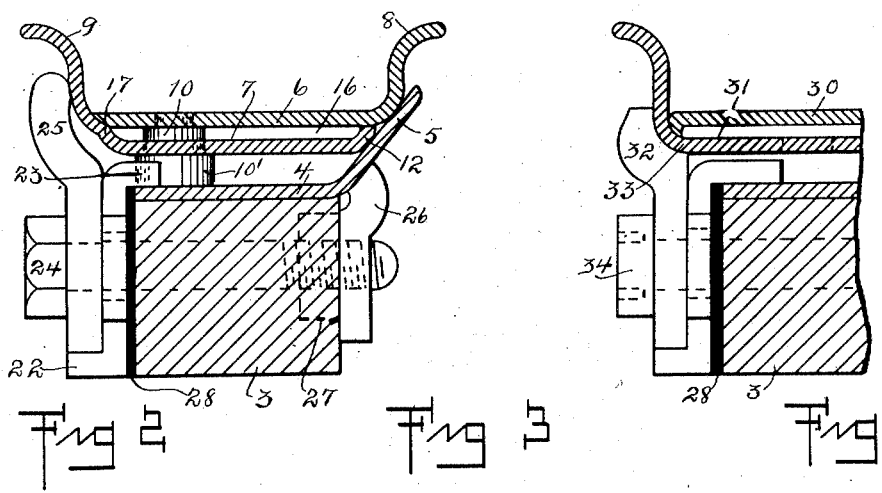
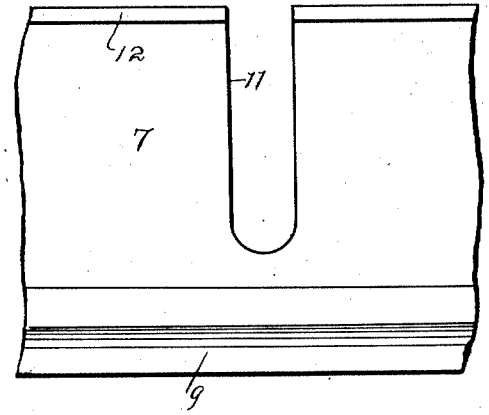
INVENTOR
A. H. Smith
BY
Arthur Phelps Maver
ATTORNEY

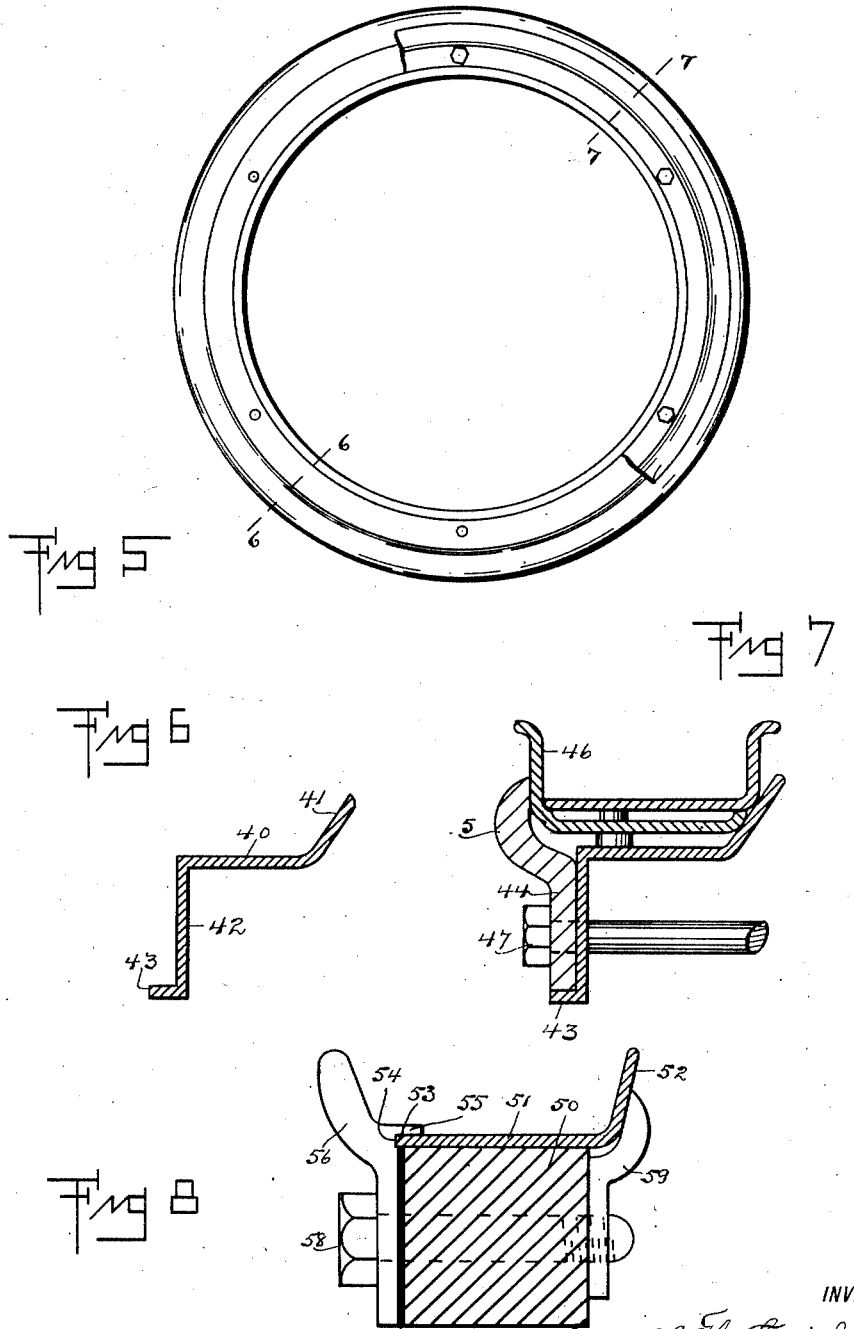

UNITED STATES PATENT OFFICE.

AMOS H. SMITH, OF NEW YORK, N. Y.

RIM FOR VEHICLE-WHEELS.

1,367,210.        Specification of Letters Patent.        Patented Feb. 1, 1921.

Application filed July 1, 1916. Serial No. 106,999.

*To all whom it may concern:*

Be it known that I, AMOS HENRY SMITH, a citizen of the United States, and resident of the borough of the Bronx, county of the Bronx, city and State of New York, have invented certain new and useful Improvements in Rims for Vehicle-Wheels, of which the following is a specification.

The subject of this application is of the general class, sometimes referred to as demountable rims, and is of the special class wherein the entire rim tire and tire supporting and receiving parts are adapted to be applied or removed from the felly or felly band of a wheel as an integral unit, and in my invention I have incorporated means for supporting the rim on the felly band, a certain and peculiar felly band for receiving the rim, means for engaging the separate portions of the rim together before they are applied on the felly band, and clamps for securing the rim in operable position as well as a means for supporting the clamps.

Particular attention is called to the fact that no wedges are used in supporting the rim, and yet the rim is spaced and secured certain definite distances away from the felly band.

The construction of my device and the advantages to be gained from it, as well as a description of its operation will be set forth as the specification progresses.

The following is what I consider a good means of carrying out this invention and the accompanying drawings should be considered in view of the specification.

In the drawings:

Fig. 1 is a fractional view of a wheel with the tire and rims omitted.

Fig. 2 is an enlarged sectional view through a felly and rim.

Fig. 3 a plan view of a portion of a rim.

Fig. 4 shows a modification in the construction of the rim holding means.

Fig. 5 shows a construction wherein the felly band and clamp supporting part are formed integral and the clamping member is also shown of integral construction. This figure is in side elevation and fractured.

Fig. 6 is a sectional view of the felly band and clamp holding member the section being taken on the line 6—6 of Fig. 5.

Fig. 7 is a sectional view of the felly band rim members and clamp. This view is taken on the line 7—7 of Fig. 5.

Fig. 8 is a sectional view of a construction wherein the clamping member is supported in a projecting portion of the felly band.

Similar reference numerals indicate like parts in all of the figures where they appear.

As my rim and clamping means may be used in conjunction with a wheel of any size or design, without modifying the action of the wheel or in any way changing its construction, I will not enter into a detail description of an ordinary wheel nor will I endeavor to show the entire wheel. I believe it sufficient to state: I utilize an ordinary wheel having a hub 1, and spokes 2, and a felly 3, exterior to the spokes.

Secured to the felly 3, is a felly band or false rim 4, having an outwardly and upwardly projecting flange 5, which projects from the back or innermost side of the wheel. This felly band 4, may be secured to the wheel in any desirable manner and may be firmly attached as it will seldom be necessary to remove the felly band, in fact, I see no reason why this band should be removed at all.

My rim consists of two parts, as indicated at 6 and 7, each of these parts is provided with a tire receiving flange on one side only, the part 6, having a tire flange 8, adapted to serve as the inner flange, and the part 7, a flange 9, serving as the outer tire receiving flange.

Secured to the portion 6, and quite near the outer edge thereof are a plurality of studs 10. I usually provide 6 of these studs and it will be noted that each stud is provided with a double shoulder and that the studs are firmly riveted into the rim member 6. The rim member 9, has a number of slots 11 entering from the inner side 12, of the rim portion, and I provide a number of such slots equal to the number of studs 10, which are secured in the rim member 6. The slots are introduced upon and engage the second shoulder of the studs 10, and when engaged upon these studs, the two rim members 6 and 7, complete a rim to receive a tire.

In conjunction with the rim, it will of course be understood that the projecting flanges 8 and 9, may be so shaped that they will receive and firmly engage and retain a tire of any construction, either a straight side or clencher or any other type of tire.

Through the rim portions 6 and 7, and through the felly and felly band, I produce an aperture 13, for the reception of the stem which receives the air valve for the tire and adjacent to this perforation 13, I secure to the under side of the rim member 7, a plurality of studs which enter apertures or recesses 14 and 15, in the felly band and felly and which prevent a creeping of the rim which creeping might sever the stem or cause a leak around the air valve.

To place a tire on my rim, it is only necessary to assemble the tire with its inner tube in position, to then pass the stem of the tire through the perforation in the member 6, and slide the tire or shoe upon the member 6. The member 7, is then placed in position with the recesses or slots 11, in line with the studs 10. An inward motion of the part 7, will cause the outer tire receiving flange 9, to engage the tire and the rim and tire may then be placed upon a wheel.

It will be noted that the rim proper does not rest upon the felly band 4, but that the rim is supported upon the felly band by the engagement of the heads 10' of the studs 10, upon the felly band. This supports the rim and tire away from the felly band, a construction well understood, and now generally adopted. It will also be noted that the construction of the separate parts of my rim is such that I produce an air space 16, between the adjacent portions of the rim. This space not only serves to assist in keeping the tire cool, but as it communicates with the tire supporting portion by reason of the slots 11, it will receive and discharge whatever water may gather in the rim or between the tire and rim. The rim member 6, is supported above or exterior to the adjacent portion of the rim member 7, by reason of the upturned edge 12, and the projection 17, formed in the rim member 7.

When the assembled rim and tire are placed upon the felly of a wheel, the inner edges of the rim members will rest upon the angularly disposed portion 5, of the felly band 4, and the outer edges of the rim members will be supported by the stud 10, it will then only be necessary to secure the rim against axial displacements, this I do by providing a number of clamping members which I will now describe.

Upon the inner edge of the felly I secure a plurality of plates 18, each provided with a perforation 19, and with lugs 20 and 21. Through the lugs 20 and 21, I insert screws which retain the plates 18, in position. Each plate is provided with a step or projection 22, extending outwardly from the felly and a second step or projection 23, extending inwardly and impinging upon the felly band 4. Through the perforation 19, and through the felly 3, I extend a bolt 24, this bolt passes through the plate 18 and receives on its outer or headed end a clamp 25, the lower end of the clamp rests upon the step 22, and the upper end of the clamp impinges upon the flange projection 9, of the rim member 7.

The inner end of the bolt 24, is received in a clamping nut 26, which may be let into the felly 3, to a limited extent as shown by the dotted lines 27, the upper end of this clamp nut 26, may engage any portion of the surface of the angular part 5, of the felly band 4.

To remove or replace the assembled rim and tire, the clamps 25, of which I will usually provide six, are loosened and swung out of position or entirely removed, and as the plate 18, and nut 26, are independently secured the position of these parts will not be changed even though the bolt 24, is entirely withdrawn.

When the clamps 25, are in position, I desire that each should bear fairly upon the rim and to prevent an undue strain upon any clamp I may pack out the plates 18, by the insertion of a shive of packing 28, thus providing a fair bearing between the clamps 25, and their supporting plates 18, without causing an undue and unnecessary stress upon the clamps 25, or bolts 24.

I call particular attention to the fact that the method of securing my rim is one that does not utilize the principle of a wedge, but that I secure the rim by compressing it between the clamp 25, and projection 5. This forces each angular portion to care for any inequalities in the rim and yet as the rim is round or approximately so, and as it is retained certain definite distances away from the felly band, by reason of the studs 10, the security of the rim in operable position cannot be questioned.

In Fig. 4, I show rim members 30, and 31 of slightly different shape, separated and retained definite distances apart by projections upon the member 30. Here the clamp 32, is provided with a step 33, which receives and supports a coincidently shaped portion of the rim members 31. Here it would not be entirely necessary to provide studs 10. I would however, perforate the rim member 31, to discharge whatever dampness or moisture that might collect between the portions of the rim. The bolt 34, shown in Fig. 4, may be operated by means of a spanner wrench.

I have found that the felly band and clamp supporting portion may be formed integral, that is may be continuous for the entire periphery of the wheel and that the clamp member may also be continuous and may be formed as a ring. This is the construction shown in Fig. 5, and in this figure the felly band is indicated at 40, and is provided with a projection 41, serving the purpose of the projecting portion 5, of the felly band shown in Fig. 2. Formed integral with the felly band is an inward extension 42, provided with a step 43, and this inwardly projecting portion and step serve the functions of the clamp supporting member 22 and 23, shown in Fig. 2.

Supported on the step 43, is a clamping member 44, formed as a ring and having an off-set projecting portion 45, which engages upon the side of a rim member 46, the clamping ring 44, is secured by a suitable bolt 47, which will operate in very much the manner set forth in connection with the bolt 24.

I have found that the felly bands and certain types of wheels project over the adjacent felly or retaining portion and in a wheel of this type I may omit the clamp supporting member 22 and 23, or the inwardly projectng portion 42, and step 43, and I may engage the clamp upon the projecting portion of the felly band. Such a construction is shown in Fig. 8, where the felly proper is indicated at 50, and the felly band at 51. The felly band may have the projection 52, arranged at a greater or less angle, as required by the particular type of rim employed. It will be noted that at the side opposite the projection 52, a porton of the felly band 53, projects beyond the adjacent edge of the felly 50.

The clamp to be employed with this construction is provided with a recess 54, or a projection 55, or both, and it is by means of the projection and recess or either of these members that the clamp 56, is retained in operative position, it being only necessary to hook the clamp or recess 54, or projection 55, upon the protruding edge 53, of the felly band 51, a soft packing member or shive 57, will insure a proper alinement and operative position of the clamps 56, and a bolt 58, operating with a clamp nut 59, will provide a sufficient rigid retaining means for the clamp 56.

It will appear obvious that parts may be used without the whole and that parts of one construction may be used in conjunction with parts of another, it will also be understood that sectional clamping means such as shown in Figs. 2 and 8, may be employed with the clamp supporting rim shown in Fig. 5, I desire however that the principles should be retained throughout, although modifications may be made within the scope of the appended claims without departing from the principle or sacrficing the advantages of the invention.

Having carefully and fully described my invention what I claim and desire to secure by Letters Patents is:

1. A device of the character described comprising a rim and means for supporting it away from the felly of a wheel, in combination with a felly band having a flange, a plurality of perforated plates secured to said felly on the side opposite to said flange, each plate having a projection extending over said felly band, and a second projection, rigid clamps supported by said second projections, and bolts passing through said plates, and through said clamps, and compressible material between said felly, and said plates to allow said clamps and said plates to be moved bodily to engage said rim, and to cause said rim to be secured between said clamps and said flange.

2. A device of the class described comprising a rim, means for supporting said rim away from the felly of a wheel, a felly band having a flange, a plurality of perforated plates secured to said felly band on the side opposite the flange, an in-turned projection on each plate extending over said felly band, an out-turned projection on each plate, clamps supported on the out-turned projections, bolts extending through said plates and clamps and nuts on the bolts for moving the plates and clamps and cause the clamps to engage said rim, whereby the rim is secured in place.

A. H. SMITH.